United States Patent
Gilbert et al.

(10) Patent No.: US 8,527,811 B2
(45) Date of Patent: Sep. 3, 2013

(54) PROBLEM RECORD SIGNATURE GENERATION, CLASSIFICATION AND SEARCH IN PROBLEM DETERMINATION

(75) Inventors: Allen M. Gilbert, Austin, TX (US); Laura Z. Luan, Hawthorne, NY (US); Daniela Rosu, Hawthorne, NY (US); Christopher Ward, Hawthorne, NY (US)

(73) Assignee: International Business Machines Corporation, Armonk, NY (US)

( * ) Notice: Subject to any disclaimer, the term of this patent is extended or adjusted under 35 U.S.C. 154(b) by 385 days.

(21) Appl. No.: 12/880,794

(22) Filed: Sep. 13, 2010

(65) Prior Publication Data

US 2012/0066547 A1 Mar. 15, 2012

(51) Int. Cl.
*G06F 11/00* (2006.01)

(52) U.S. Cl.
USPC .................................. 714/26; 714/25; 714/33

(58) Field of Classification Search
USPC .................... 714/25, 26, 33, 37, 38.1, 45, 46; 707/723, 748
See application file for complete search history.

(56) References Cited

U.S. PATENT DOCUMENTS

| | | | |
|---|---|---|---|
| 5,319,779 A | | 6/1994 | Chang et al. |
| 5,805,160 A | | 9/1998 | Yoshida et al. |
| 6,327,677 B1 | | 12/2001 | Garg et al. |
| 7,065,467 B1 | | 6/2006 | Ohsie et al. |
| 7,133,866 B2 | | 11/2006 | Rishel et al. |
| 7,249,286 B1 | | 7/2007 | Krishnan |
| 8,028,197 B1 * | | 9/2011 | Barua et al. ............. 714/26 |
| 2005/0097396 A1 * | | 5/2005 | Wood ............. 714/25 |
| 2006/0101308 A1 | | 5/2006 | Agarwal et al. |
| 2008/0126283 A1 | | 5/2008 | Odom et al. |
| 2008/0201279 A1 | | 8/2008 | Kar et al. |
| 2009/0063387 A1 | | 3/2009 | Beaty et al. |
| 2010/0082620 A1 * | | 4/2010 | Jennings et al. ............. 707/736 |
| 2010/0318846 A1 * | | 12/2010 | Sailer et al. ............. 714/26 |
| 2010/0318847 A1 * | | 12/2010 | Beg et al. ............. 714/26 |
| 2011/0054964 A1 * | | 3/2011 | Anand et al. ............. 705/7 |

OTHER PUBLICATIONS

Yang Song et al., "Problem Classification Method to enhance the ITIL Incident, Problem and Change Management Process," WWW2008, Apr. 21-25, 2008, Beijing, China.
Eugene Agichtein, et al., "Improving Web Search Ranking by Incorporating User Behavior Information," SIGIR '06, Aug. 6-11, 2006, Seattle, Washington.
Cynthia Dwork, et al, "Rank Aggregation Methods for the Web," pp. 613-622, WWW10, May 1-5, 2001, Hong Kong.
Glen Jeh, et al., "SimRank: A Measure of Structural-Context Similarity," pp. 1-11, Stanford University.
Xiubo Geng, et al., "Feature Selection for Ranking," SIGIR '07.
P. Brittenham, et al., "IT Service Management Architecture and Autonomic Computing," IBM Systems Journal, vol. 46, No. 3, 2007 p. 565-581.
Prasa M. Deshpande, et al., "Efficient Online Top-K Retrieval With Arbitrary Similarity," edbt' 2008, Mar. 25-30, 2008, Nantes, France.

* cited by examiner

*Primary Examiner* — Joseph D Manoskey
(74) *Attorney, Agent, or Firm* — F. Chau & Associates, LLC; Louis J. Percello

(57) ABSTRACT

A method for problem determination and resolution in an information technology (IT) system includes receiving a problem ticket, searching a database for a plurality of problem features based on data included in the problem ticket, extracting the plurality of problem features from the database, and generating a problem signature corresponding to the problem ticket, wherein the problem signature comprises at least one non-textual feature extracted from the plurality of problem features.

16 Claims, 10 Drawing Sheets

PROBLEM RECORD SIGNATURE GENERATION, CLASSIFICATION AND SEARCH IN PROBLEM DETERMINATION

BACKGROUND

1. Technical Field

The present disclosure relates to a system and method for problem determination in an information technology (IT) system or environment, and more particularly, to a system and method for generating and utilizing a multi-dimensional problem signature for problem determination in an IT system or environment.

2. Discussion of Related Art

Problems tend to become increasingly complex in information technology (IT) systems and environments over time. A problem may exhibit a number of symptoms across distributed computer systems and applications. The symptoms may be identified in a number of ways such as, for example, analyzing error messages and application logs and monitoring system events and system vitals series. The symptoms may also exhibit certain spatial and temporal relationships in relation to each other.

In addition to identifying and analyzing symptoms of a problem, a problem may also be identified and characterized based on system configurations, software versions, and the type of systems and platforms in the IT environment.

Problems are typically characterized manually by the user. For example, a user may record a non-structured textual description of the symptoms of a problem in a problem ticket. Thus, symptoms and system data may not be collected and included in the problem description. This results in incomplete information and decreased ability to reuse the problem resolution for problem determination of future tickets relating to the IT environment. Further, characterizing problems manually results in the inability to characterize complex problems, since manual characterization does not allow for the extraction and consolidation of various perspectives and related contexts into a problem signature. For example, manually characterizing problems may not account for useful, non-textual information such as system vitals information represented as plot images or matrices. In addition, searching problem repositories is typically keyword based, which is often ineffective and cumbersome when searching problems having complex characteristics.

BRIEF SUMMARY

According to an exemplary embodiment of the present disclosure, a computer readable storage medium embodying instructions executed by a processor to perform a method for problem determination and resolution in an information technology (IT) system includes receiving a problem ticket, searching a database for a plurality of problem features based on data included in the problem ticket, extracting the plurality of problem features from the database, and generating a problem signature corresponding to the problem ticket, wherein the problem signature comprises at least one non-textual feature extracted from the plurality of problem features.

According to an exemplary embodiment of the present disclosure, a computer readable storage medium embodying instructions executed by a processor to perform a method for self-learning relevant features of a problem signature includes receiving the problem signature and an associated problem solution, identifying a set of stored problem signatures in a problem signature and solution repository, wherein each stored problem signature is associated with a stored problem solution that is substantially similar to the problem solution associated with the received problem signature, and each stored problem signature comprises a plurality of features, generating a set of common features, wherein each feature in the set of common features is present in each stored problem signature, applying a first weighting factor to each of the plurality of features in the plurality of stored problem signatures that are present in the set of common features, and applying a second weighting factor to each of the plurality of features in the plurality of stored problem signatures that are not present in the set of common features.

According to an exemplary embodiment of the present disclosure, a problem determination and solution system includes a problem management system configured to receive a problem ticket, and configured to extract a plurality of problem features from a plurality of databases, and a problem signature generator configured to generate a problem signature, wherein the problem signature comprises at least one non-textual feature extracted from the plurality of problem features.

BRIEF DESCRIPTION OF THE SEVERAL VIEWS OF THE DRAWINGS

Preferred embodiments of the present disclosure will be described below in more detail, with reference to the accompanying drawings.

DETAILED DESCRIPTION

Figure 1:
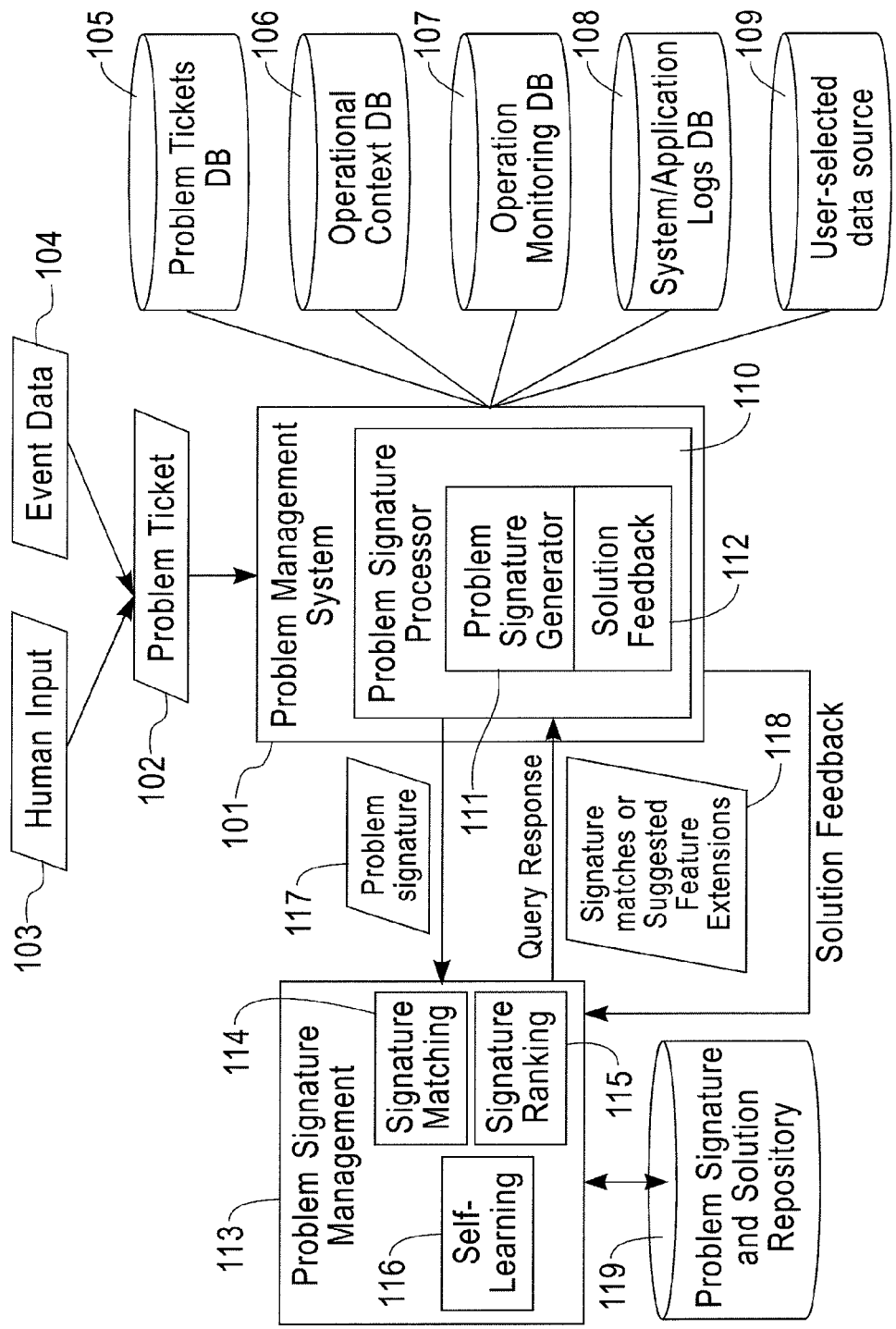
FIG. 1 is an overview of a problem determination and solution system, according to an exemplary embodiment of the present disclosure.

According to an exemplary embodiment of the present disclosure, a multi-dimensional problem signature is generated and used to identify a problem or faulty condition in an information technology (IT) system or environment. Because the problem signature is multi-dimensional, it can represent complex problem characteristics. For example, non-textual features (e.g., system vitals information such as processor and memory utilization history represented as plot images or matrices) and textual features (e.g., error messages) may be integrated to form a multi-dimensional problem signature. The problem signature may utilize both the symptoms of a problem and system data to identify the problem. The problem signature may be generated using problem data (e.g., symptoms) input by a user, data obtained by monitoring different kinds of events occurring in the system, and/or the extraction of data (e.g., problem features) from a plurality of data sources (e.g., ticketing systems, monitoring systems, configuration databases).

Once the multi-dimensional problem signature has been generated, a distance-based or pattern-based matching method may be applied to identify and search for similar problem signatures in solution repositories. Searching solution repositories with a multi-dimensional problem signature may improve the speed, efficiency, and accuracy in problem determination in IT systems or environments.

Exemplary embodiments of the present disclosure may be used for general problem diagnosis and management in a number of domains such as, for example, IT operation, medical diagnosis, transportation systems, utility services, and other domains having problems exhibiting complex and multi-dimensional characteristics.

Exemplary embodiments of the present disclosure now will be described more fully hereinafter with reference to the accompanying drawings. This disclosure, may however, be embodied in many different forms and should not be construed as limited to the embodiments set forth herein.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Exemplary embodiments of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 is an overview of a problem determination and solution system, according to an exemplary embodiment of the present disclosure. A problem management system 101 allows a user to analyze and manage problem tickets. The problem management system 101 receives a problem ticket 102 as input. The problem ticket 102 may be created based on human input 103 and/or event data 104 corresponding to different kinds of monitored events that occur in the IT system or environment. The problem ticket 102 may include, for example, a description of user reported incidents or problems or details collected by the monitoring system. The data in the inputted problem ticket 102 is used to query and extract problem features from a plurality of databases including, for example, a problem tickets database 105, an operational context database 106, an operation monitoring database 107, a system/application logs database 108, and a user-selected, problem-specific data source 109. The problem tickets database 105 includes a collection of incident/problem tickets. The operational context database 106 includes up-to-date system configuration data. The operation monitoring database 107 includes current and historic system/application vital data, which is collected from running systems and applications. The system/application logs database 108 includes log data collected from running systems and applications, which is stored in a central repository or on the running system or application (e.g., the target system or application). The problem management system 101 includes a problem signature processor 110, which includes a problem signature generator 111 and a solution feedback component 112. Once the input received by the problem management system 101 has been utilized to query the plurality of databases, the problem signature processor 110 generates a problem signature. The generated problem signature is sent to a problem signature management system 113, where problems with matching signatures are searched for. References to the problems with matching signatures are presented to the user, and recorded for future reference and automated processing. The user may use the references to the problems with matching signatures to find the root cause and a solution to the current problem. The problem signature management system 113 may include a signature matching module 114, a signature ranking module 115, and a self-learning module 116. The signature matching module 114 and signature ranking module 115 are used during the search for a matching problem signature. The input to a search request is a problem signature 117 and the output 118 may include a list of references to the problems and associated solutions that have a high degree of similarity to the problem signature 117, or suggestions for expanding a list of features in the problem signature 117 to improve the chance of matching with problems in the problem signature and solution repository 119. The problem signature management system 113 is connected to the problem signature and solution repository 119, which is a knowledge database that stores known problem signatures and corresponding solutions. The problem signature management system 113 accesses and manages the data stored in the problem signature and solution repository 119. For example, the problem signature management system 113 may create new problem signatures and add them to the problem signature and solution repository 119, delete stored problem signatures from the problem signature and solution repository 119, or search signatures in the problem signature and solution repository 119. The solution feedback component 112 is used to refine the association between the problem signature 117 and solutions that are stored in the problem signature and solution repository 119, in order to trim the set of features collected and associated with a problem to only those features that most closely represent the root cause of the problem. For example, because memory utilization statistics do not closely represent the root cause of a problem relating to high processor (e.g., Central Processing Unit (CPU)) utilization, memory utilization statistics may be discarded from the problem record in the problem signature and solution repository 119 based on the input from the solution feedback component 112. In an exemplary embodiment, the solution feedback component 112 may receive input indicating which features of the problem are relevant for solving the problem. The input may be provided by a system administrator handling the resolution of the problem via a graphical user interface (GUI) or command line interaction. In another exemplary embodiment, the solution feedback component 112 may determine the relevant features by automated analysis of a problem solution. For example, the solution feedback component 112 may send new information to the problem signature management system 113, and the self-learning component 116 may apply changes to the data stored in the problem signature and solution repository 119 to store this new information and make it available for future searches.

The problem signature generator 111 generates a problem signature 117 that is used for problem management. A problem signature 117 is a distinctive characteristic, or a distinctive set of characteristics, extracted from an incident/problem ticket 102, an event 104, and related data from a plurality of databases. A problem signature 117 may be used to identify a faulty condition or the root cause of a faulty condition.

The problem signature 117 includes a multi-dimensional structure representation. For example, the problem signature may include both textual features such as, for example, error messages, and non-textual features such as, for example, system vitals variations (e.g., plots, patterns, graphs). The problem signature allows for the aggregation of complex problem characteristics into a format that allows for pattern-matching. Characteristics of the problem signature may include, for example, spatial patterns, temporal patterns, system vitals, user reports (e.g., ticket descriptions), logs, error codes, error messages, and event data corresponding to monitored events.

An exemplary application environment will now be described. An exemplary application system includes a portal server at the front end of the system. The portal server provides resource information that a user is entitled to receive in the application environment. The resource information is stored in a backend Lightweight Directory Access Protocol (LDAP) server, which includes an embedded database. If a user has a large number of accounts and a large number of entitlements, the embedded database on the LDAP server may crash as a result of low memory. This results in the user receiving an application portal error. Upon receiving the application portal error, the user may open a new problem ticket 102 including a textual description of the problem and an application portal URL. For example, the problem ticket may read, "PORTAL APPLICATION FAILED TO DISPLAY HOME PAGE UPON USER LOG IN." The problem ticket is then input to the problem management system 101. A number of operations may then be carried out by the problem signature generator 111. For example, the problem signature generator 111 may identify a reference to the portal application in the problem ticket 102, collect information about the related computer systems and applications from the operational context database 106, collect recent tickets related to the components in the application environment from the problem tickets database 105, collect traces of system vitals relating to CPU and memory usage in the application environment, as well as traces of system vitals relating to database log files, locks, and transactions, from the operation monitoring database 107, and collect log entries from the system/application logs database 108. The resulting information is used to generate a problem signature.

Figure 4:
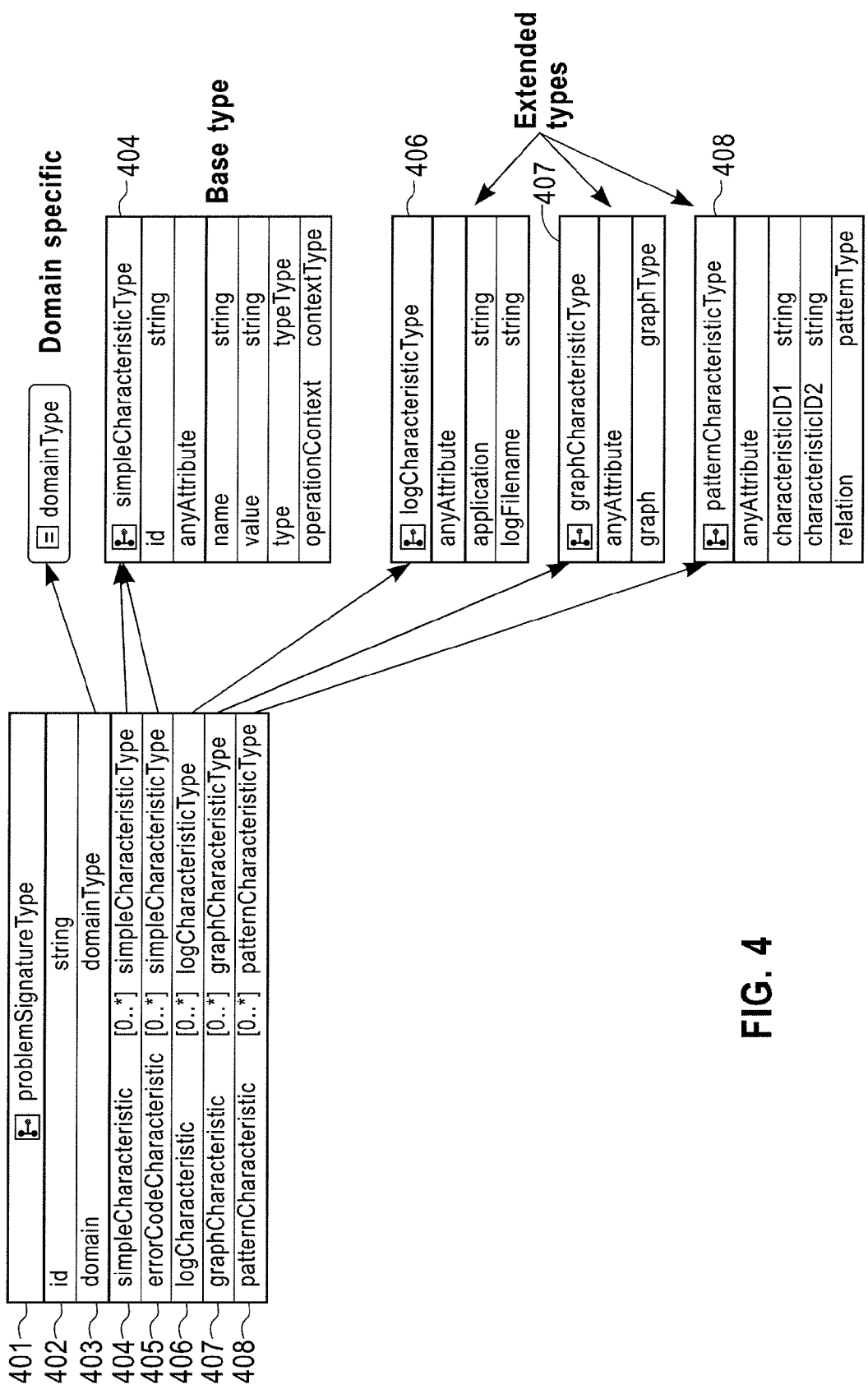
FIG. 4 is a model of a problem signature, according to an exemplary embodiment of the present disclosure.

The generated problem signature may include a variety of components. For example, a problem signature may include a set of keywords obtained from the problem ticket description (e.g., textual feature), a set of system components related to the operational context (e.g., textual feature), a set of log entry descriptors related to the embedded database error (e.g., textual feature), a set of log entry descriptors related to the LDAP error (e.g., textual feature), a pattern description of the interleaved occurrence of log entries for the LDAP and embedded database errors and ticket occurrence times (e.g., non-textual feature), and a time series descriptor for CPU and memory system vitals (e.g., non-textual feature). An exemplary problem signature is shown in FIG. 4.

Figure 2A:
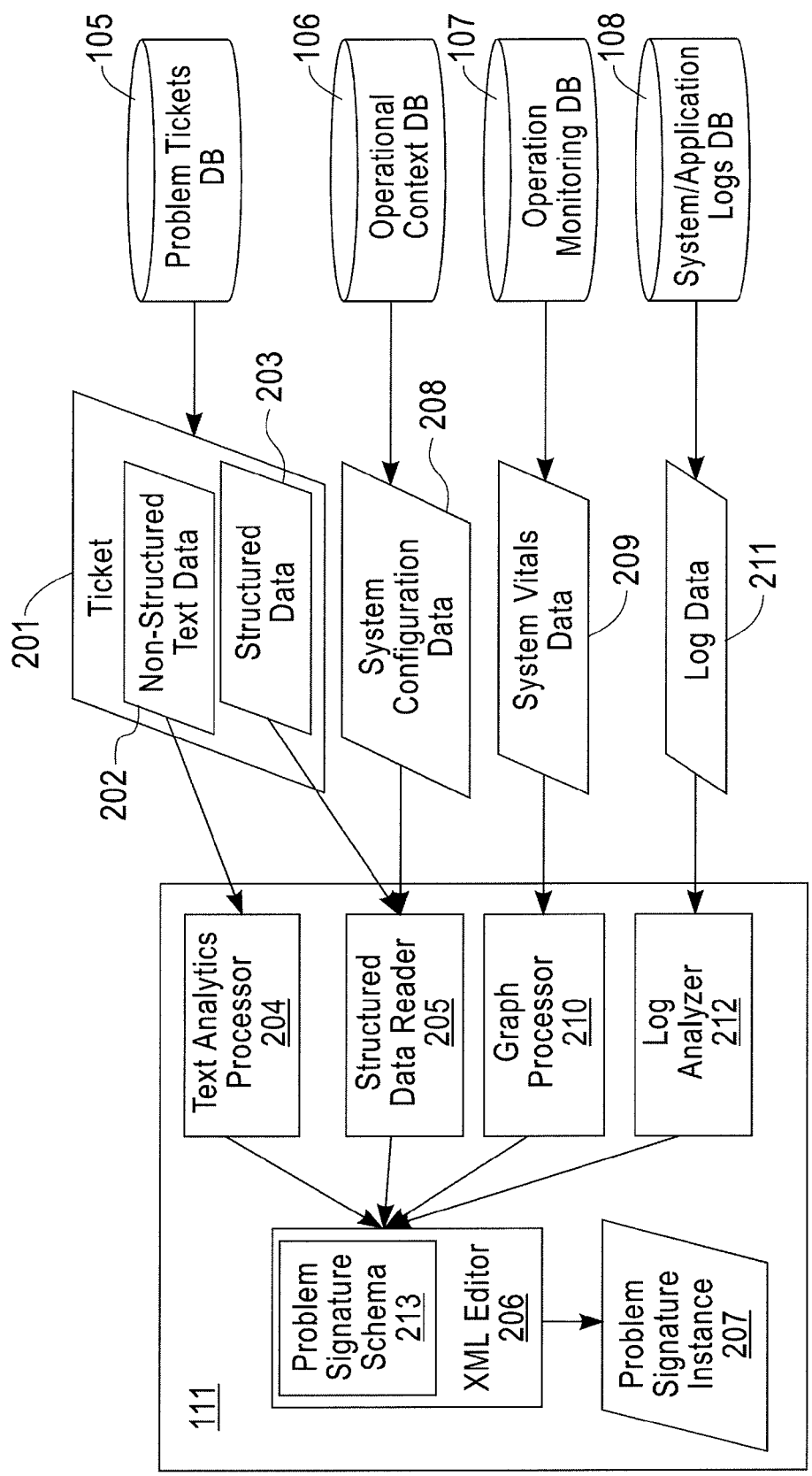
FIG. 2A is a flow chart of the extraction and analysis of a plurality of problem features from a plurality of data sources, according to an exemplary embodiment of the present disclosure.

FIG. 2A illustrates the extraction and analysis of a plurality of problem features from a plurality of data sources that occurs within the problem signature generator 111, according to an exemplary embodiment of the present disclosure. As shown in FIG. 2A, a problem signature can be automatically generated for a new problem via the extraction of problem features from various data sources such as, for example, ticketing systems, monitoring systems, and configuration databases. For example, a problem signature may be automatically generated via the extraction of problem features from the problem tickets database 105, the operational context database 106, the operation monitoring database 107, and the system/application logs database 108. The problem tickets database 105 is searched for tickets related to the new problem, and related ticket data 201, including both non-structured text data 202 and structured data 203, may be extracted. Non-structured text data 202 is input to the text analytics processor 204 in the problem signature generator 111, and structured data 203 is input to the structured data reader 205 in the problem signature generator 111. The text analytics processor 204 processes non-structured text data, extracts key content (e.g., keywords from a problem description field), and provides input to the XML editor 206 for the creation of relevant characteristic elements in the problem signature 207. System configuration data 208 such as, for example, operational context data including structured data corresponding to software version, system type/build, and system configuration, is extracted from the operational context database 106 and is input to the structured data reader 205 in the problem signature generator 111. The structured data reader 205 processes structured data in tickets and from other sources (e.g., the operational context database 106), and provides input to the XML editor 206 for the creation of relevant characteristic elements in the problem signature 207. System vitals data 209 such as, for example, graph data and plot data, is extracted from the operation monitoring database 107 and is input to the graph processor 210 in the problem signature generator 111. The graph processor 210 processes relevant graph data of system vitals and provides input to the XML editor 206 for the creation of relevant characteristic elements in the problem signature 207. Logs 211 are extracted from the system/application logs database 108 and are input to the log analyzer 212 in the problem signature generator 111. The log analyzer 212 parses relevant logs and provides input to the XML editor 206 for the creation of relevant characteristic elements in the problem signature 207. The XML editor 206 uses a system-specific problem signature schema 213 to generate a problem signature instance 207 based on the processed data and conforming with the problem signature schema 213.

Figure 2B:
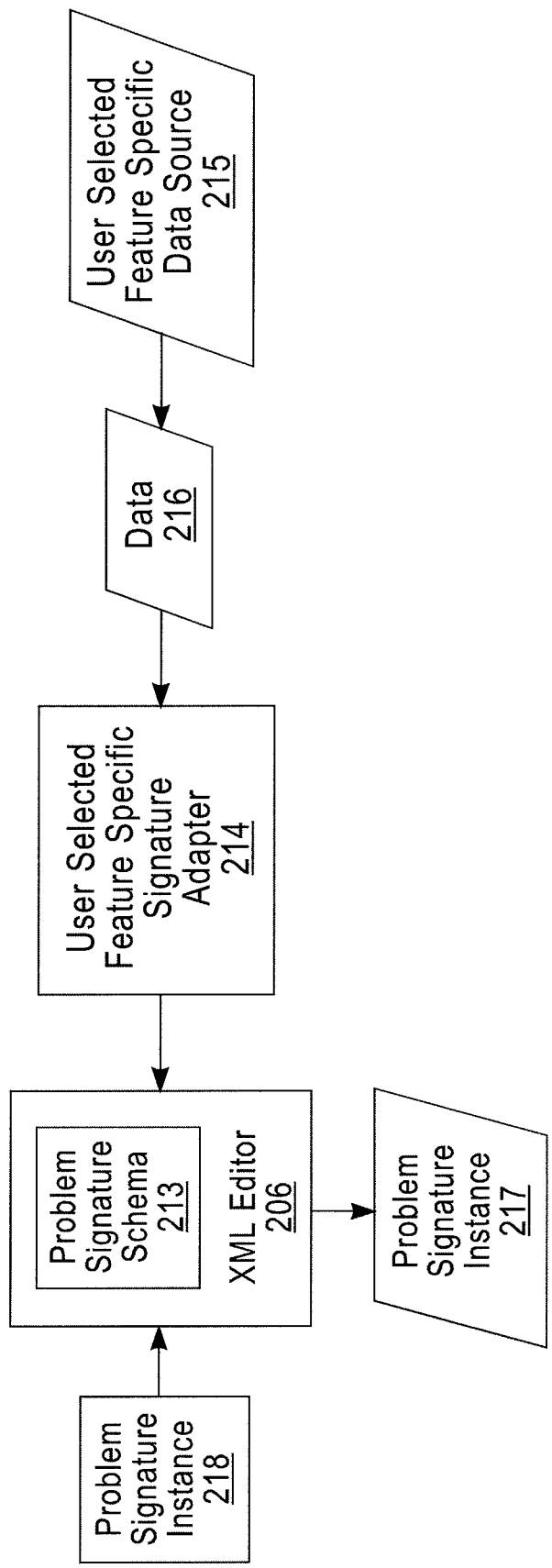
FIG. 2B is a flow chart of an incremental mode of the problem signature generator of FIG. 1, according to an exemplary embodiment of the present disclosure.

FIG. 2B illustrates the incremental mode of the problem signature generator 111. The incremental mode is used for augmenting the problem signature 207 that is automatically generated by the method described in reference to FIG. 2A with features that are extracted from data acquired with user assistance. The data may be acquired manually or semi-automatically. For example, the user may invoke the process with a feature-specific signature extractor 214 and a feature-specific data source 215 or data content 216. The feature-specific signature adapter 214, which corresponds to the problem signature generator 111, extracts data from the feature-specific data source 215 or data content 216, and inputs the data to the XML editor 206. The XML editor 206 uses a system-specific problem signature schema 213 to output a new problem signature instance 217 based on a previous problem signature instance 218 and the new data.

Figure 3:
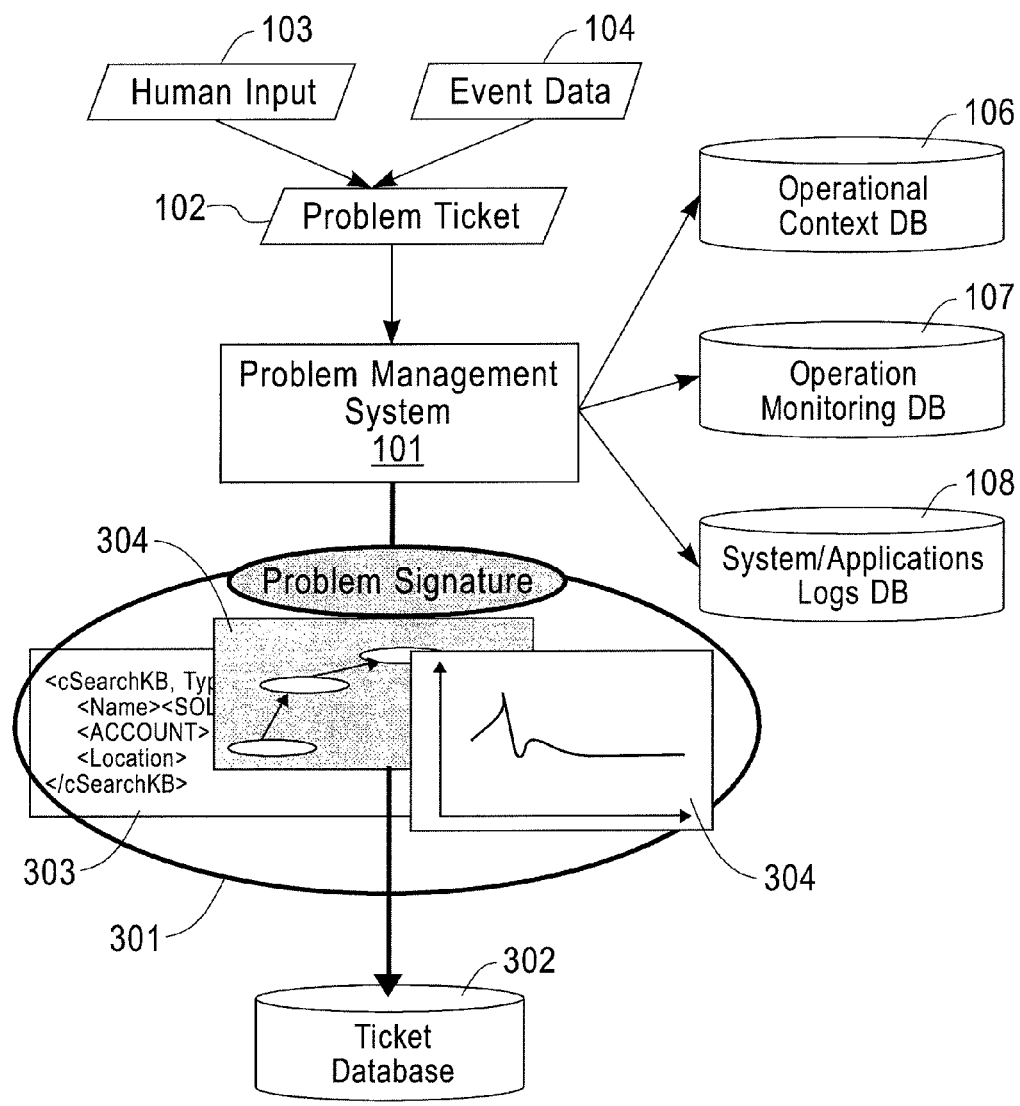
FIG. 3 is a flow chart of a system for creating a problem signature, according to an exemplary embodiment of the present disclosure.

FIG. 3 illustrates a system configured for the creation of a problem signature 301 that is stored in a ticket database 302, according to an exemplary embodiment of the present disclosure. In FIG. 3, a problem ticket 102 is input to the problem management system 101. The problem management system 101 uses this data to query the operational context database 106, operation monitoring database 107 and system logs database 108. The problem signature 301 is generated and stored in the ticket database 302 or a dedicated database that associates tickets with their signatures. As shown in FIG. 3, the problem signature 301 includes a collection of elements in different formats, including, for example, textual structured data 303 and non-textual data 304.

FIG. 4 illustrates a model for a problem signature 401, according to an exemplary embodiment of the present disclosure. The problem signature 401 is shown in an XML schema format. The problem signature 401 has an id attribute 402 for identifying the problem signature instance. The domain attribute 403 is used to organize problem signature collections and facilitate search and retrieval. The problem signature 401 includes a set of characteristics of various types. The simpleCharacteristic element 404 is a problem characteristic instance for textual descriptions and/or keywords. The data type is simpleCharacteristicType. The problem signature 401 may contain any number of simpleCharacteristic elements 404. The errorCodeCharacteristic element 405 is a problem characteristic instance for error codes. The data type is simpleCharacteristicType. The problem signature 401 may contain any number of errorCodeCharacteristic elements 405. The logCharacteristic element 406 is a problem characteristic instance for system/application logs. The data type is logCharacteristicType, which is an extension of the data type simpleCharacteristicType. The problem signature 401 may contain any number of logCharacteristic elements 406. The graphCharacteristic element 407 is a problem characteristic instance for system vitals graphs. The data type is graphCharacteristicType, which is an extension of data type simpleCharacteristicType. The problem signature 401 may contain any number of graphCharacteristic elements 407. The patternCharacteristic element 408 is a problem characteristic instance for temporal and spatial relationships among the characteristics of the problem signature 401. The data type is patternCharacteristicType, which is an extension of data type simpleCharacteristicType. The problem signature 401 may contain any number of patternCharacteristic elements 408.

Once the problem signature has been generated, the problem signature is used to search the problem signature and solution repository 119 for similar problem signatures and related solutions. According to an exemplary embodiment of the present disclosure, a distance-based search may be performed. The distance-based search determines a measure of the difference between signatures based on a selected set of features (e.g., characteristic types) of the signatures selected for search. The selected set of features may comprise one or more of the features in the input problem signature. Distance metrics can be defined for each type of feature. For example, text features may utilize a distance metric for bag-of-words, numeric features may utilize a scaled absolute difference, non-textual features in bitmap representation may utilize a distance metric for bitmaps, and non-textual features in graph representation may utilize a graph-specific distance.

Feature selection may be performed manually or automatically. When feature selection is performed manually, features may be selected based on user knowledge such as, for example, the problem type and specifics of the IT environment represented in the problem signature and solution repository 119. When feature selection is performed automatically, a pattern-based approach may be used. For example, the features may be selected based on an identified pattern of problem signature feature values, such as a set of keywords in the problem description. Relevant patterns and their mapping to features may be identified using expert knowledge or machine-learning based tools.

In an exemplary embodiment of the present disclosure, the feature search may be performed using parallel processing in a distributed heterogeneous content repository (e.g., search engine and databases) in order to improve the scalability of the system and keep the response time within user-acceptable bounds.

In an exemplary embodiment, a search can be implemented by rank aggregation, resulting in a final order of search results that is based on an ordering of per-feature search results. For each feature in the selected set, a search is performed with respect to the feature and using a feature-specific distance metric. The list of search results is ordered by a feature-specific distance metric. Once the search results have been retrieved, the results are aggregated based on rank.

Rank aggregation may be performed using a variety of aggregation methods known in the art. For example, ranking can be based on the position in the majority of the lists. Ranking may also utilize two features with a weighted average of the rank scores. This method can be extended to utilize multiple features. Ranking may also be based on a support vector machine (SVM) on a set of features annotated with user preferences.

In an alternative exemplary embodiment, a distance-based problem signature matching method may be implemented to use a distance score computed by aggregation of the per-feature distance scores for all of the features selected for the search.

Figure 5:
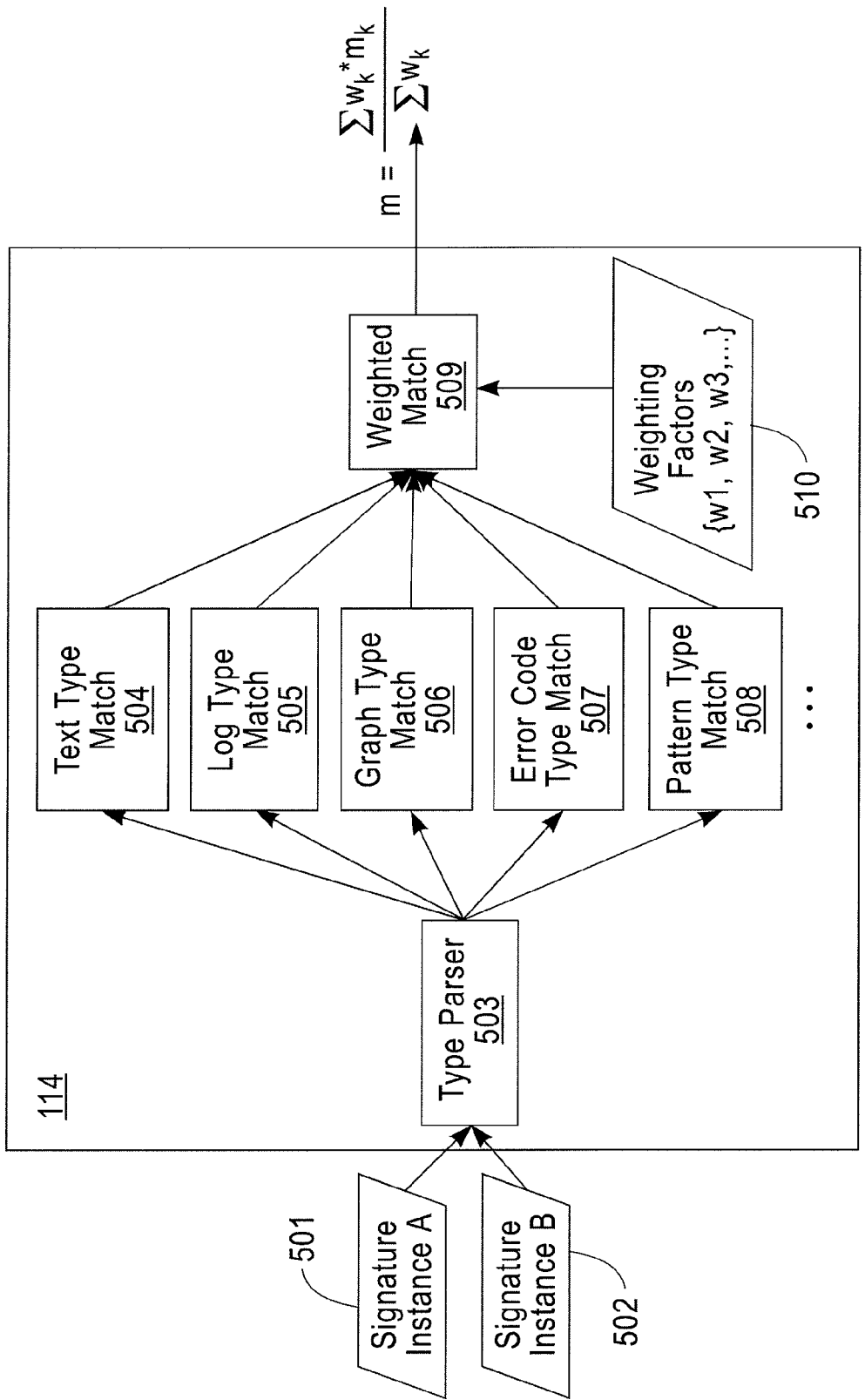
FIG. 5 is a flow chart of the signature matching module of FIG. 1, according to an exemplary embodiment of the present disclosure.

FIG. 5 shows the signature matching module 114 according to an exemplary embodiment of the present disclosure. In FIG. 5, the generated problem signature is compared with each problem signature in the problem signature and solution repository 119. For example, in the exemplary embodiment in FIG. 5, signature instance A 501 (e.g., the generated problem signature) and signature instance B 502 (e.g., a candidate signature from the problem signature and solution repository 119) are input to the type parser module 503 within the signature matching module 114. The type parser module 503 parses the features of signature instance A 501 and signature instance B 502. For example, text data of the signature instances is input to and compared in the text type match module 504, data logs of the signature instances are input to and compared in the log type match module 505, graph type data of the signature instances is input to and compared in the graph type match module 506, error code data of the signature instances is input to and compared in the error code type match module 507, and pattern data from the signature instances is input to and compared in the pattern type match module 508. Each of the match modules assigns a match score $m_k$ to the compared features based on the similarity of the values. Each match score $m_k$ is sent from its respective match module to the weighted match module 509. The weighted match module 509 applies a set of weighting factors (e.g., w1, w2, w3, ... ) received from the weighting factors module 510 to each match score and aggregates the results to determine an overall match score m. Match score m represents the similarity of signature instance A 501 and signature instance B 502, and may be determined using the following equation:

$$m = \frac{\sum w_k * m_k}{\sum w_k}$$

For example:

Signature Instance A={a1,a2,a3,a4,a5}

Signature Instance B={b1,b2,b3}

{a1},{b1}: simpleCharacteristic element

{a2,a3},{b2}: logCharacteristic element

{a4,a5},{b3}: patternCharacteristic element

The weighting factors are determined based on each signature. In an exemplary embodiment, the weights of each feature can be set to values predefined in the problem signature management system 113 configuration. Alternatively, the weight for each feature for a problem signature that is not in the problem signature and solution repository 119 is set to 1/(number of features defined in the signature). For a problem signature that is in the problem signature and solution repository 119, the feature weights are determined by the self-learning module 116 with the method illustrated in FIG. 8, and the weight $w_K$ corresponding to the K-th feature in the comparison of the two problems signatures, A and B, is a function of the corresponding weights $wa_K$ and $wb_K$ of problem A and B, respectively. The weight $w_K$ may be defined as the product of the related weights in the two signatures (e.g., $W_K = wa_K * wb_K$). The value of some features may be defined by a set of unqualified components with similar semantics. For example, this is specific for the features that identify the lists of related servers, CIs (configuration items) or related problems, as well as CI relationship graphs.

Figure 6:
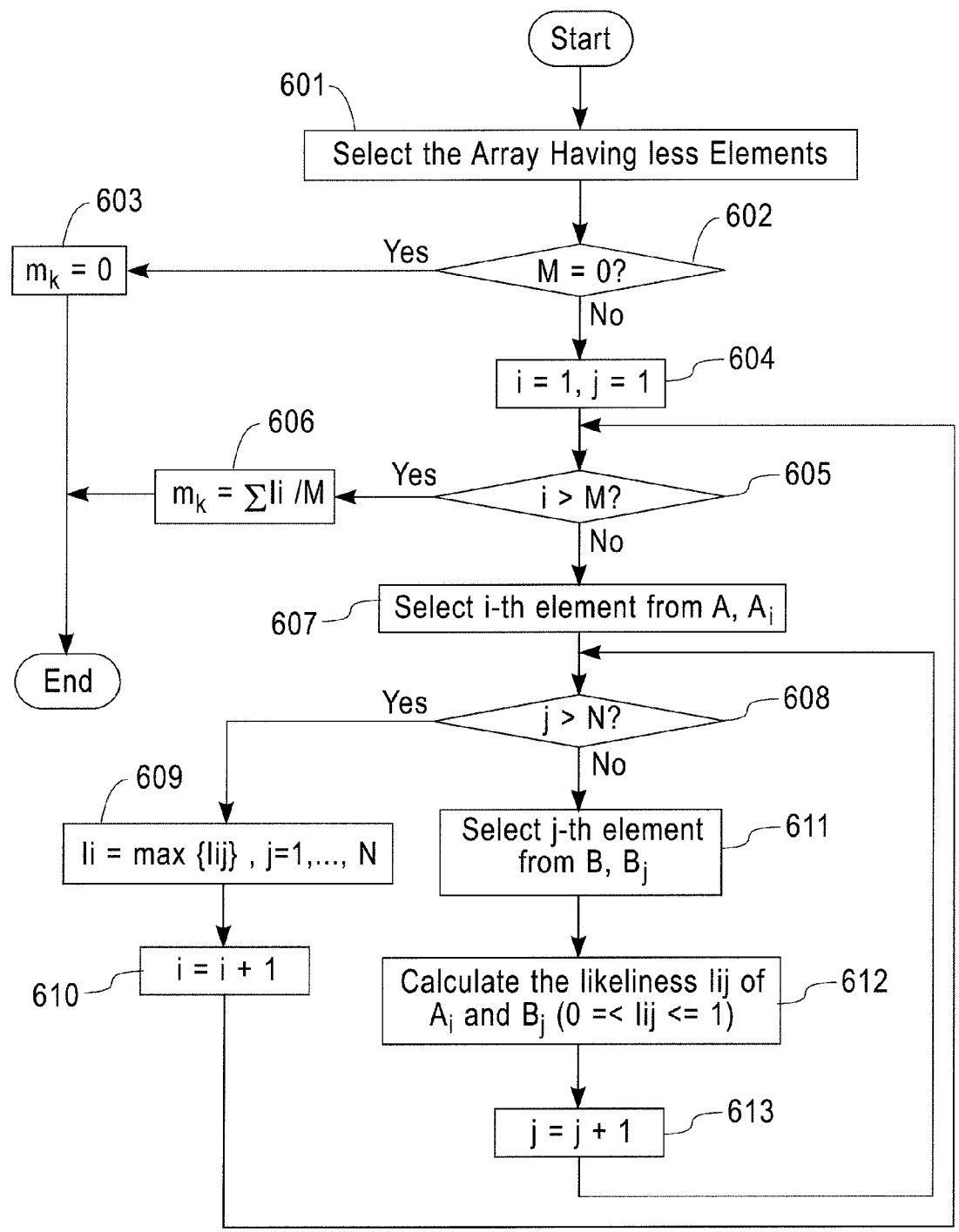
FIG. 6 is a flow chart of a method for determining a match score $m_k$ for each feature of a problem signature, according to an exemplary embodiment of the present disclosure.

FIG. 6 shows a method for determining a match score $m_k$ for a feature, K, represented as a set of unqualified elements, according to an exemplary embodiment of the present disclosure. Two sets of elements represented as arrays of the same data type—one from signature instance A and one from signature instance B—are received as input. The number of elements in each array is compared, and the array having less elements is selected at block 601. For example, if the array for signature instance A has M elements and the array for signature instance B has N elements, and M N, the array for signature instance A is selected. Block 602 determines whether the selected array has zero elements. If the selected array has zero elements, the method progresses to block 603, where:

$m_k=0$

If the array has at least one element, the method progresses to block 604, where:

i=1,j=1

At block 605 it is determined whether i>M. If i≦M, the i-th element from the array of signature A is selected at block 607. At block 608, it is determined whether j>N. If it is determined that j≦N, the j-th element from the array of signature B is selected at block 611. At block 612, the likeliness li(j) of $A_i$ and $B_j$ is calculated, where 0≦li(j)≦1. At block 613, j is incremented, and the method proceeds to block 608. If j>Nat block 608, the method proceeds to block 609, where li is the maximum value in lij values:

$$li = \max\{l_{ij}\}, j=1, \ldots, N$$

At block 610, i is incremented, and the method proceeds to block 605. At block 605, If i>M, the method progresses to block 606, where:

$$m_k = \sum \frac{li}{M}$$

Figure 7:
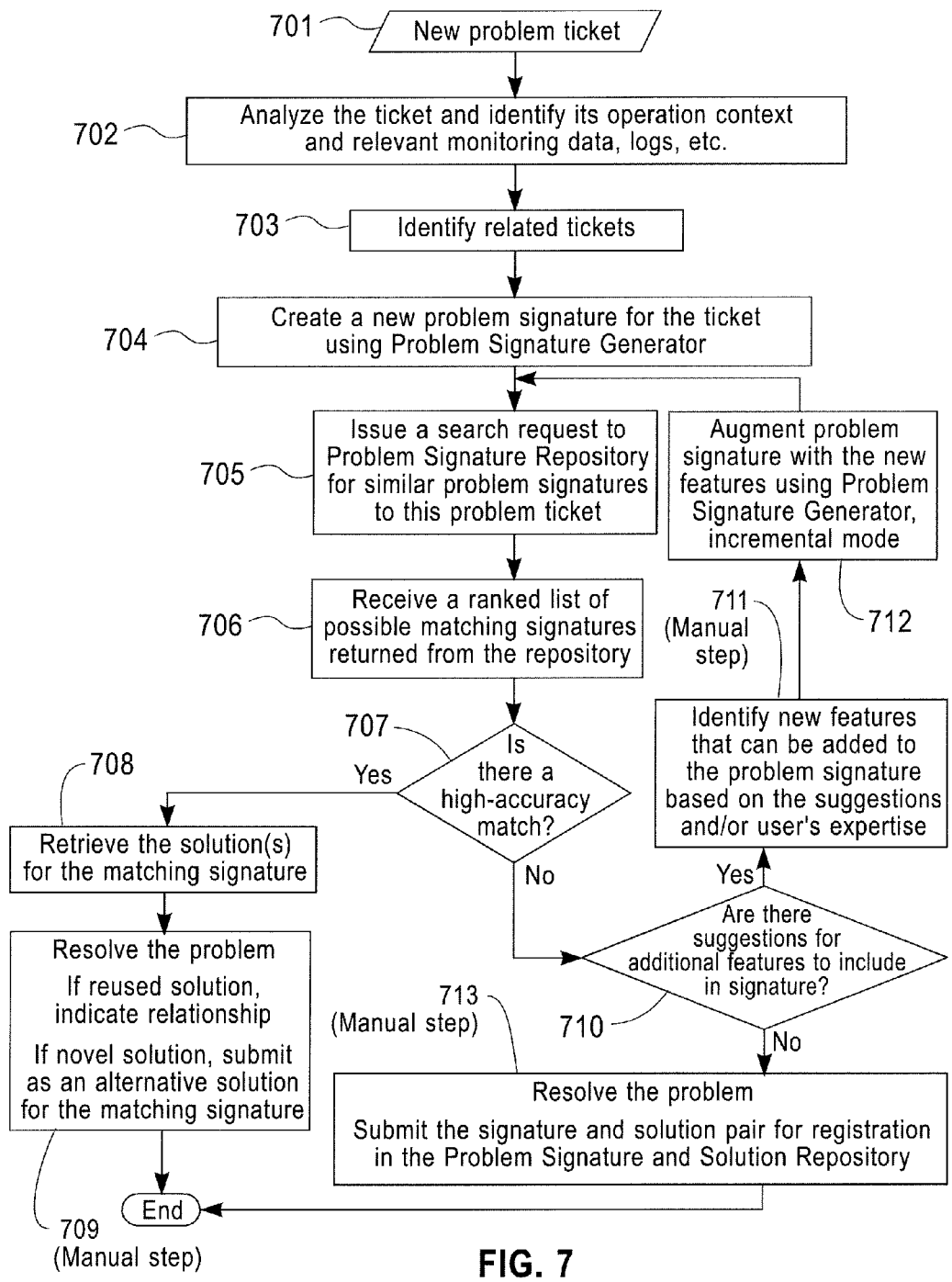
FIG. 7 is a flow chart of a method for using a multi-dimensional problem signature in problem determination, according to an exemplary embodiment of the present disclosure.

FIG. 7 illustrates a method for using a multi-dimensional problem signature in problem determination, according to an exemplary embodiment of the present disclosure.

Referring to FIG. 7 and FIG. 1, a new problem ticket 701 is entered into the problem management system 101. The problem ticket 701 is analyzed at block 702 using the problem tickets database 105, operational context database 106, operation monitoring database 107, and/or system/application logs database 108. Related problem tickets are identified at block 703, and a new problem signature is generated by the problem signature generator 111 at block 704. Once the new problem signature has been generated, it is used to search the problem signature and solution repository 119 for similar problem signatures at block 705. The distance-based search approach or the pattern-matching based search approach, as described above, may be implemented when searching the problem signature and solution repository 119. The problem signature and solution repository 119 returns a ranked list of possible matching problem signatures at block 706. At block 707, it is determined whether a high-accuracy match exists among the ranked list of possible matching problem signatures. If a high-accuracy match is found, at least one solution is retrieved from the problem signature and solution repository 119 at block 708. At block 709, a user resolves the problem. If the user uses the solution retrieved from the problem signature and solution repository 119, the user can indicate the relationship between the solved problem and the retrieved solution. If the user uses another solution to solve the problem, the user can submit the solution as an alternative solution for the matching signature. If a high-accuracy match is not found at block 707, the system selects the highest accuracy search results, and identifies the set of features that are present in the signatures of the search results but are not present in the problem signature used for the search. These features are returned to the user as suggestions for expanding the signature in order to find better matches. It is determined whether there are suggestions for additional features to include in the problem signature at block 710. If there are no suggestions, the method proceeds to block 713. At block 713, a user develops a new solution and solves the problem. The problem signature and the solution pair is submitted to the problem signature and solution repository 119. If there are suggestions at block 710, the method proceeds to block 711 where the user identifies the new features that can be added to the problem signature. At block 712, the problem signature is augmented with the new features using the problem signature generator 111 in the incremental mode as shown in FIG. 2B. The method then returns to block 705, where another search request is issued to the problem signature and solution repository 119 to find problem signatures similar to the problem ticket.

In an exemplary embodiment, the problem signature and solution repository 119 may be utilized to distinguish between validated and not-validated solutions. The solutions stored in the problem signature and solution repository 119 can be marked as valid, invalid, unknown, or not-validated. This allows the user to find various types of solutions that match the problem signature of interest, while also being made aware of the risk of implementing different types of solutions. For example, validated solutions carry a lower risk than unknown or not-validated solutions, and are recommended and/or validated by experts. According to an exemplary embodiment, when a new solution is registered in the problem signature and solution repository 119 at steps 709 and 713, the system marks the new solution as not-validated and generates a note for a designated expert. The expert determines whether the solution is valid in a manual, off-line process. Upon completion of the analysis, the expert accesses the problem signature and solution repository 119 and marks the solution as valid, not-valid, or unknown.

Figure 8:
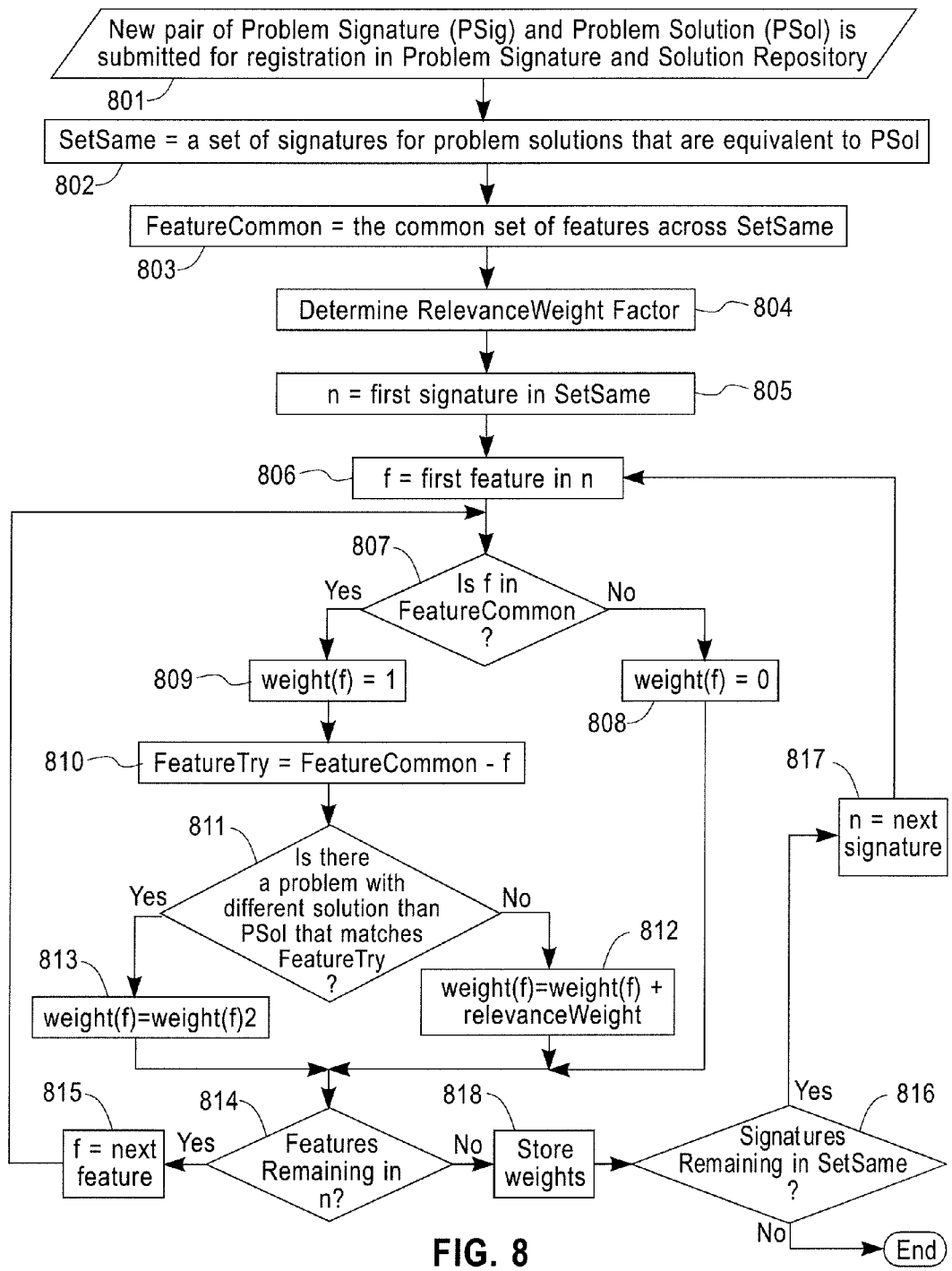
FIG. 8 is a flow chart of a method for self-learning the relevant features of a problem signature, according to an exemplary embodiment of the present disclosure.

According to an exemplary embodiment of the present disclosure, self-learning of feature relevance may be performed by the problem determination and solution system in the self-learning component 116. Self-learning of feature relevance results in an accurate characterization of a faulty condition, and may improve the efficiency of problem classification and search. The method of self-learning determines weights for each of the features in a signature that reflect the relevance of the feature for the distinctiveness of the solution. If the correlation between a feature value and the solution is high, the weight of the feature is higher. The weights computed by the self-learning method are stored in the signature and solution repository 119 in relationship to the signature, and used by the weighted match module 511 for the distance-based search approach. FIG. 8 illustrates the method for self-learning of feature relevance, according to an exemplary embodiment of the present disclosure. The method may include identifying the common set of features across problem signatures that lead to the same, or similar problem solutions, determining qualifying differences between similar problem signatures that lead to different problem solutions, and computing weights for the various features to be used in the assessment of the aggregate distance between problem signatures.

As shown in FIG. 8, a new pair of a problem signature (Psig) and a problem solution (Psol) is submitted to the problem signature and solution repository 119 for registration at block 801. At block 802, a set of problem signatures in the problem signature and solution repository 119 corresponding to solutions that are equivalent to the newly submitted problem solution (e.g., solutions having the same outcome as Psol), referred to as SetSame, is determined. At block 803, the common set of features that are present (e.g., features with defined values) in all of the problem signatures in SetSame, referred to as FeatureCommon, is determined. At block 804, a RelevanceWeight factor, which is used in the weight setting of the features that are highly relevant for the solution, is determined. In an exemplary embodiment, the Relevance-Weight factor may be reversely proportional to the number of features defined across all of the equivalent solutions in FeatureCommon (e.g., RelevanceWeight=1/(the number of features in FeatureCommon)). The self-learning process starts with the first signature, n, in SetSame at block 805, and the first feature, f, in the signature at block 806. At block 807, it is determined whether the feature, f, is in FeatureCommon. If f is not in FeatureCommon, the weight for f is set to 0 at block 808, and the process proceeds to block 814. If f is in Feature-Common, the weight for f is set to 1 at block 809. A set of features that comprises all of the features in FeatureCommon except the current feature f, referred to as FeatureTry, is created at block 810. At block 811, the problem signature and solution repository 119 is searched for a problem having both a solution that is not equivalent to the newly submitted solution PSol (e.g., a problem signature that is not in SetSame) and features that closely match the set of features in FeatureTry. If such a problem exists, the current feature f is not highly relevant for the solution, and its weight is decreased using, for example, a multiplicative decrease model at block 813. For example, the decrease factor may be 2. If such a problem does not exist, the current feature f is highly relevant for the solution, and its weight is increased additively with a factor equal to RelevanceWeight at block 812. At block 814, it is determined whether there are additional features not checked yet in the signature, n. If additional features are present, the next feature is selected at block 815, and the process proceeds to block 807. If no additional features are present, it is determined whether there are additional signatures remaining in SetSame at block 816. If additional signatures are present, the next signature is selected at block 817, and the first feature in the next signature is selected at block 806. The process then proceeds to block 807. If there are no additional signatures in SetSame that were not analyzed, the self-learning process ends. Once all of the per-feature weights have been defined, the weights are normalized such that the overall sum is equal to 1. In block 818, the resulting weights are stored in the signature and solution repository 119 in relationship with the signature. The weights can be revised again upon receiving solution feedback provided by a problem analyst using the solution feedback module 112. The process of self-learning can be executed upon the submission of a new instance of a problem signature and a solution, or in a batch mode. When utilizing the batch mode for all or some of the newly created instances, the batch mode may be executed at a time when the computation overhead does not affect the quality of the user experience. The self-learning of feature relevance results in the ability to identify new types of problems and to build and refine the problem signature and solution repository 119 in response to changes in the IT environment.

According to an exemplary embodiment of the present disclosure, a problem signature can be used for rule-based reasoning and case-based reasoning. For example, a problem signature can be used to represent complicated conditions in rule-based reasoning, or to provide a simple and consolidated model in case-based reasoning.

The flowcharts and block diagrams in the figures illustrate the architecture, functionality, and operation of possible implementations of systems, methods and computer program products according to various embodiments of the present disclosure. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 9:
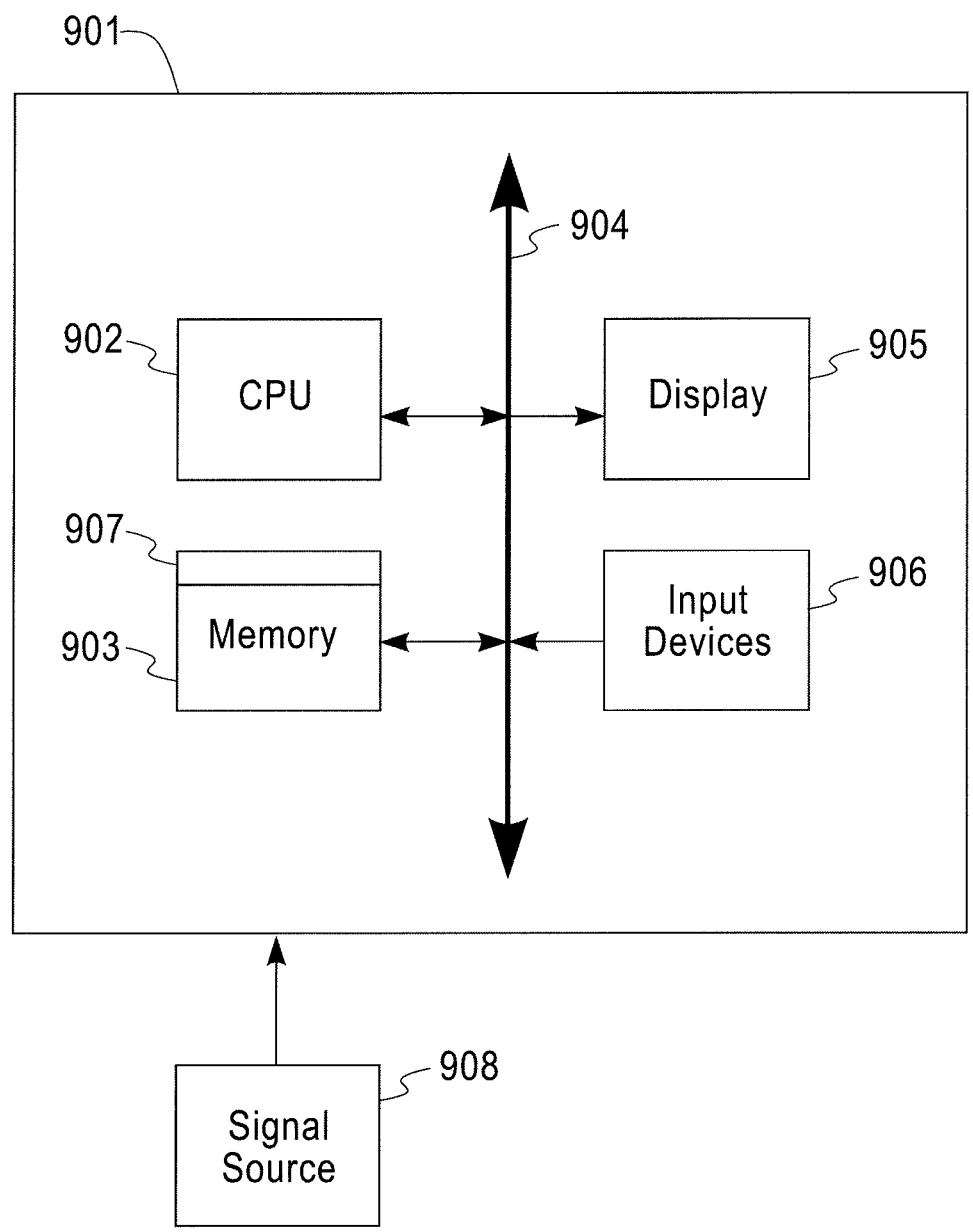
FIG. 9 is a computer system for implementing a method according to an exemplary embodiment of the present disclosure.

More particularly, referring to FIG. 9, according to an exemplary embodiment of the present disclosure, a computer system 901 for implementing a system and method for problem determination in an information technology (IT) system or environment can comprise, inter alia, a central processing unit (CPU) 902, a memory 903 and an input/output (I/O) interface 904. The computer system 901 is generally coupled through the I/O interface 904 to a display 905 and various input devices 906 such as a mouse and keyboard. The support circuits can include circuits such as cache, power supplies, clock circuits, and a communications bus. The memory 903 can include random access memory (RAM), read only memory (ROM), disk drive, tape drive, etc., or a combination thereof. The present invention can be implemented as a routine 907 stored in memory 903 (e.g., a non-transitory computer-readable storage medium) and executed by the CPU 902 to process the signal from the signal source 908. As such, the computer system 901 is a general-purpose computer system that becomes a specific purpose computer system when executing the routine 907 of the present invention.

The computer platform 901 also includes an operating system and micro-instruction code. The various processes and functions described herein may either be part of the micro-instruction code or part of the application program (or a combination thereof) which is executed via the operating system. In addition, various other peripheral devices may be connected to the computer platform such as an additional data storage device and a printing device.

Having described embodiments for system and method for problem determination in an information technology (IT) system or environment, it is noted that modifications and variations can be made by persons skilled in the art in light of the above teachings. It is therefore to be understood that changes may be made in exemplary embodiments of the disclosure, which are within the scope and spirit of the invention as defined by the appended claims. Having thus described the invention with the details and particularity required by the patent laws, what is claimed and desired protected by Letters Patent is set forth in the appended claims.

What is claimed is:

1. A computer readable storage medium embodying instructions executed by a processor to perform a method for problem determination and resolution in an information technology (IT) system, comprising:
   receiving a problem ticket;
   searching a database for a plurality of problem features based on data included in the problem ticket;
   extracting the plurality of problem features from the database; and
   generating a problem signature corresponding to the problem ticket, wherein the problem signature comprises at least one non-textual feature extracted from the plurality of problem features,
   wherein extracting the plurality of problem features comprises extracting ticket data from a problem tickets database, extracting system configuration data from an operational context database, extracting system vitals data from an operation monitoring database, and extracting log data from a system logs database in a central repository on a target system.

2. The computer readable storage medium of claim 1, wherein the problem signature is generated to include at least one textual feature extracted from the plurality of problem features.

3. The computer readable storage medium of claim 1, wherein the data included in the problem ticket comprises input from a user and event data corresponding to at least one monitored event in the IT system.

4. The computer readable storage medium of claim 1, wherein searching the database for the plurality of problem features is based on a problem feature manually selected and input by a user.

5. The computer readable storage medium of claim 1, wherein extracting the ticket data from the problem tickets database comprises extracting non-structured text data and structured data.

6. The computer readable storage medium of claim 1, further comprising creating and integrating characteristic elements in the problem signature based on the extracted ticket data, system configuration data, system vitals data, and log data.

7. The computer readable storage medium of claim 1, further comprising generating a new problem signature based on a previous problem signature and new features extracted from the database.

8. The computer readable storage medium of claim 1, further comprising identifying a matching problem signature by comparing the generated problem signature with each of a plurality of problem signatures in a problem signature and solution repository.

9. The computer readable storage medium of claim 8, wherein identifying the matching problem signature further comprises searching the problem signature and solution repository based on a defined set of features in the generated problem signature.

10. The computer readable storage medium of claim 8, wherein identifying a matching problem signature further comprises:
   parsing a plurality of features in the generated problem signature;
   parsing a plurality of features in a candidate problem signature;
   separating the parsed plurality of features in the generated problem signature and the candidate problem signature into a plurality of subgroups, wherein each subgroup comprises features having a same feature type;
   assigning a match score to each subgroup, wherein each match score is determined by comparing features in each subgroup;
   applying a set of weighting factors to each match score; and
   computing an overall match score for the generated problem signature and the candidate problem signature, based on an aggregation of the match scores of each subgroup.

11. The computer readable storage medium of claim 10, further comprising:
   generating a ranked list of a plurality of candidate problem signatures; and
   identifying the matching problem signature based on the ranked list of the plurality of candidate problem signatures.

12. The computer readable storage medium of claim 8, wherein the problem signature and solution repository comprises a plurality of solutions, and each of the plurality of solutions is associated with a validation ranking indicating whether each solution has been identified as a valid solution for the generated problem signature.

13. A computer readable storage medium embodying instructions executed by a processor to perform a method for problem determination and resolution in an information technology (IT) system, comprising:
   receiving a problem ticket;
   searching a database for a plurality of problem features based on data included in the problem ticket;
   extracting the plurality of problem features from the database;
   generating a problem signature corresponding to the problem ticket, wherein the problem signature comprises at least one non-textual feature extracted from the plurality of problem features;
   identifying a set of features present in a plurality of problem signatures in a problem signature and solution repository, wherein the set of features comprises only features that are not present in the generated problem signature;
   generating a notification suggesting that the set of features be added to the generated problem signature;
   identifying at least one feature from the set of features to be added to the generated problem signature; and
   augmenting the generated problem signature with the at least one identified feature from the set of features.

14. A computer readable storage medium embodying instructions executed by a processor to perform a method for self-learning relevant features of a problem signature, comprising:
   receiving the problem signature and an associated problem solution;
   identifying a set of stored problem signatures in a problem signature and solution repository, wherein each stored problem signature is associated with a stored problem solution that is substantially similar to the problem solution associated with the received problem signature, and each stored problem signature comprises a plurality of features;
   generating a set of common features, wherein each feature in the set of common features is present in each stored problem signature;
   applying a first weighting factor to each of the plurality of features in the plurality of stored problem signatures that are present in the set of common features; and
   applying a second weighting factor to each of the plurality of features in the plurality of stored problem signatures that are not present in the set of common features.

15. The computer readable storage medium of claim 14, further comprising:
   generating a set of candidate features including each of the plurality of features in the set of common features, wherein the set of candidate features does not include a current feature; and
   identifying a stored problem signature in the problem signature and solution repository, wherein the identified stored problem signature is associated with a stored problem solution that is different from the problem solution associated with the received problem signature, and includes a plurality of features that are substantially similar to the set of candidate features.

16. A computer readable storage medium embodying instructions executed by a processor to perform a method for problem determination and resolution in an information technology (IT) system, comprising:
   receiving a problem ticket;
   searching a database for a plurality of problem features based on data included in the problem ticket;
   extracting the plurality of problem features from the database; and
   generating a problem signature corresponding to the problem ticket, wherein the problem signature comprises at least one non-textual feature extracted from the plurality of problem features, wherein extracting the plurality of problem features comprises extracting ticket data from a problem tickets database, and extracting the ticket data from the problem tickets database comprises extracting non-structured text data and structured data.

* * * * *